ns Patent Office 3,005,519
Patented Oct. 24, 1961

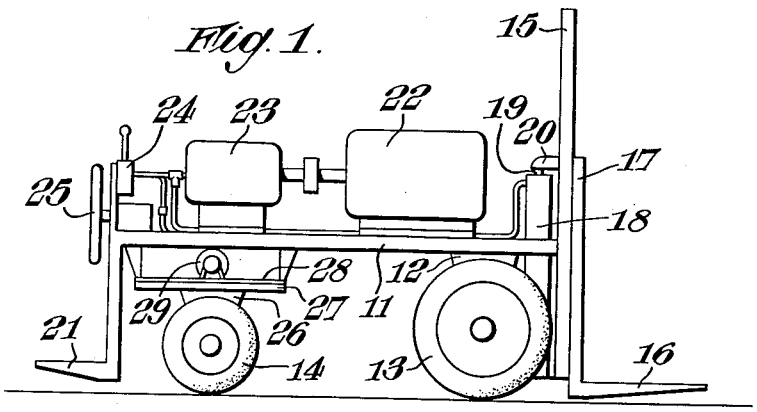
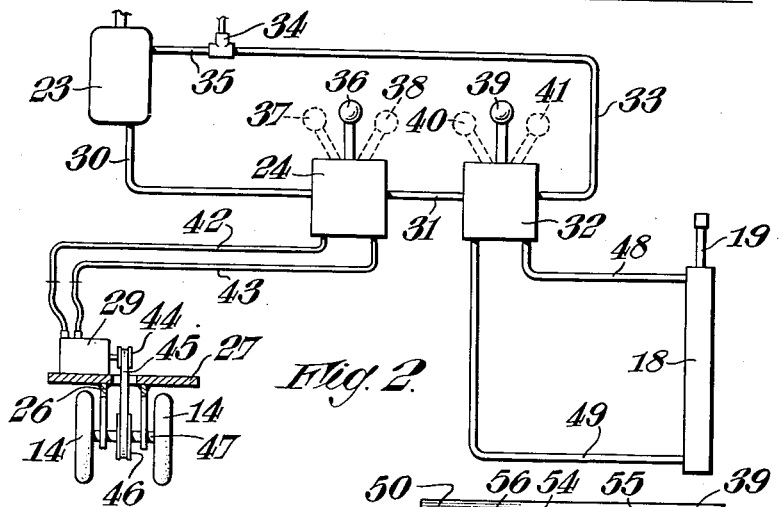
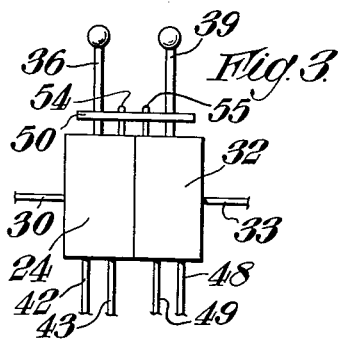
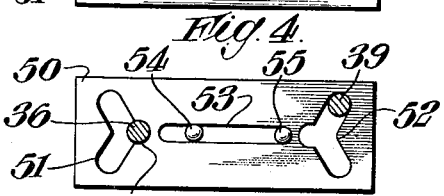

3,005,519
MECHANICAL LOAD HANDLING EQUIPMENT
Erik ten Kate, % "Brimex" Works, Yorktown Industrial Estate, Camberley, Surrey, England
Filed Dec. 11, 1959, Ser. No. 858,990
Claims priority, application Great Britain Jan. 9, 1959
3 Claims. (Cl. 187—9)

This invention relates to mechanical load handling equipment and is more particularly concerned with those kinds of equipment consisting of mobile units equipped with lifting apparatus and commonly referred to as lifters, stackers or fork-lift trucks.

Trucks of this type are known in which a power unit, for example, an electric, gas or petrol motor, and suitable transmission means are provided, whereby the truck is mechanically driven by the power unit, and equipped additionally with a hydraulic supply and hydraulic lifting means by which a platform or a forked lifting element can be elevated for the purpose of lifting, transporting and stacking loads.

Fork-lift trucks are generally fitted with petrol or diesel engines and a clutch, gearbox, Cardan shaft and differential rear axle, following the well-established practice with road vehicles. A pump, which provides the hydraulic energy, is either permanently coupled to the engine or may be engaged with the engine by suitable means. The mechanism of these trucks is necessarily complicated because of the mechanical transmission to the driving wheel or wheels and the hydraulic equipment for the lifting mechanism. It is the primary object of the present invention to provide load handling equipment which is simpler and more compact than those hitherto known.

According to the invention mobile load handling equipment comprises a wheeled chassis, a power unit mounted on the chassis, a hydraulic pump driven by the power unit, a hydraulic motor adapted to drive at least one of the chassis wheels, hydraulic lifting means, and hydraulic control means for separately controlling the hydraulic motor and the lifting means.

The chassis may be steerable.

Conveniently the hydraulic motor and one or two wheels of the chassis are mounted on a turntable, the hydraulic motor being in driving engagement with the wheel or wheels, whereby rotation of the turntable enables the vehicle to be steered.

The hydraulic control means comprises two three-position valves, one for the hydraulic motor and the other for the hydraulic lifting means, the one valve providing forward reverse and neutral positions for the motor, the other providing lift, lower and neutral positions for the lifting means. The valves are mechanically interlocked by means of a slide connection between separate actuators for the respective valves to prevent the simultaneous operation of both valves.

In order that the invention may easily be understood one embodiment thereof will now be described by way of example with the aid of the accompanying drawings in which:

FIGURE 1 is a representation of a fork-lift truck embodying the invention;

FIGURE 2 is a diagram of the hydraulic circuit;

FIGURE 3 shows two hydraulic control valves with a mechanical interlock between their operating levers; and FIGURES 4 and 5 show two positions of the mechanical interlock.

FIGURE 1 is a representation of a fork-lift truck which is not intended to represent a specific design, the parts having been arranged in such a manner as to facilitate a description of the invention. It is to be understood that the invention may be applied with equal facility to many different kinds of truck.

The truck represented in FIGURE 1 comprises a wheeled chassis composed of a frame 11, brackets 12 carrying a pair of wheels 13 and a further pair of steerable wheels 14. Any kind of steering arrangement may be used, but FIGURE 1 illustrates a preferred method. Although a four-wheeled truck is shown in FIGURE 1, the invention may equally well be applied to a three-wheeled vehicle.

At the front end of the truck a framework 15 is provided to form a slide for a fork-lift device 16 attached to a member 17 adapted to slide vertically in the framework 15. Hydraulic lifting means consist of a hydraulic jack 18 including a piston and cylinder, the piston rod 19 being connected to the sliding member 17 by means of a bridge piece 20, so that if a load is placed above the fork-lift device 16 and the hydraulic jack 18 is served with an appropriate hydraulic supply, the fork-lift device 16 will rise and lift the load.

At the rear of the truck is a platform 21 upon which an operator may stand and the controls, to be described later, are conveniently grouped above this platform. Mounted on the chassis 11 is a power unit 22 which may consist of a petrol, gas or oil engine, or an electric motor. The power unit is coupled to a hydraulic pump 23 which provides power in the form of hydraulic energy to operate the lifting device and also to propel the truck. Control of the hydraulic apparatus is provided by a pair of control valves of which one, 24, is visible in FIGURE 1, the other being immediately behind it. A steering wheel 25 is provided for steering the truck and is coupled to mechanism now to be described.

The two wheels 14 are supported on brackets 26 which are attached to a turntable 27 associated with a circular platform 28 fixed to the chassis 11. Suitable steering linkage, which does not form a part of the present invention, but which may be of conventional type and is therefore not shown, connects the steering wheel 25 to the turntable 27 so that rotation of the steering wheel 25 causes the turntable 27 to turn and thus alter the orientation of the brackets 26, whereby the vehicle is steered. A hydraulic motor 29 is mounted on the turntable 27 and is coupled by suitable driving means to an axle which carries the wheels 14. The hydraulic circuitry and a more detailed arrangement of the turntable 27 and the drive from the hydraulic motor 29 are shown in FIGURE 2, which will now be referred to.

As seen in FIGURE 2, the hydraulic pump 23 has an outlet conduit 30 which is connected to the hydraulic control valve 24, previously mentioned, from which a duct 31 is connected to the second hydraulic control valve 32. A duct 33 leads from the latter through a T 34 to a further conduit 35 which is connected to the inlet of the hydraulic pump. The T 34 is connected to a supply tank (not shown) which contains a supply of hydraulic liquid and which may, if desired, be accompanied by appropriate filtering means in accordance with known practice. The control valve 24 has an actuator in the form of an operating lever 36, shown in a central or neutral position and movable in two directions to positions 37 and 38 respectively, while the control valve 32 has its own actuator in the form of an operating lever 39 which is similarly movable from a neutral position to two positions 40 and 41.

Two pipes 42 and 43, each of which terminates in a flexible portion, lead from the control valve 24 to the hydraulic motor 29. As shown in more detail in FIGURE 2 the hydraulic motor 29 is provided with a pulley 44 on the end of its shaft and this is coupled by a belt 45 to a further pulley 46 mounted on the axle 47 which carries the wheels 14. Other forms of power transmission may be used between the motor and the axle.

Two pipes 48 and 49 lead from the control valve 32 to the two ends of the hydraulic jack 18 which constitute the lifting means.

In operation the hydraulic pump 23 is continuously driven by the power unit 22 and hydraulic liquid flows through the duct 30 to the control valve 24, from the valve through the duct 31 to the control valve 32, and thence through the ducts 33 and 35 back to the pump 23, the conduits 42, 43, 48 and 49 being isolated when the control levers 36 and 39 are in the neutral position, as shown.

If the valve actuator 36 is moved to the position 37, then the connection between ducts 30 and 31 is broken within the valve and the liquid flowing through the duct 30 is diverted to duct 42 and into the hydraulic motor while liquid returning through the duct 33 is directed into the duct 31 and thence back to the hydraulic pump. Since the hydraulic motor offers resistance to the flow of liquid pressure develops and the hydraulic motor begins to run and to drive the wheels 14 through the transmission members 44, 45, 46 and 47. The direction of rotation of the hydraulic motor 29 depends upon the direction in which the liquid flows through it and by placing the control lever 36 in the position 38, the duct 30 is connected to duct 43 while the duct 42 is connected to duct 31, so that the motor runs in the opposite direction. Thus the three-way valve 24 provides a control by which the motor may be isolated or may be caused to run in either direction. The truck is driven forwards or backwards and may be steered by operation of the steering wheel 25, which causes the turntable 27 to rotate, carrying the hydraulic motor 29 with it, the movement of the hydraulic motor being accommodated by the flexible pipes. It will be understood that suitable stops are provided to limit the rotation of the turntable in either direction from a central position.

The control valve 32 functions in a similar manner to the valve 24. If the actuator 39 therefor is placed in the position 40 the connection between ducts 31 and 33 is broken and liquid flows from the duct 31 to the duct 49 and thence into the lower end of the hydraulic jack 18, to cause the piston rod 19 of the latter to extend and lift the load resting upon the fork-lift device 16, while liquid displaced from the top of the jack flows through the duct 48 and ducts 33 and 35 back to the hydraulic pump. Placing the actuator lever into position 41 produces the same condition, except that the direction of flow through the ducts 48 and 49 is reversed and the hydraulic jack 18 is caused to lower the load.

It will be noted that the two control valves are connected in series in the hydraulic circuit comprised of ducts 30, 31, 33 and 35, and operation of the control levers 36 or 39 individually causes the hydraulic motor to run or the hydraulic jack 18 to operate. If both controls are operated at once, however, then the hydraulic motor and the hydraulic jack are connected in series and the pump 23 is required to propel the truck and lift the load at the same time. This may overload the pump 23. Furthermore, if the truck were left standing with the power unit stopped and without the brake being set, with a raised load on the fork-lift device 16, and both controls were operated simultaneously by an unauthorized person, the weight of the load could cause the hydraulic jack to force liquid out through the duct 49 through the ducts 31 and 43 to the hydraulic motor and further through the ducts 42 and 30 back to the pump 23. If the power unit rotates easily, then the pump would rotate, driven by the hydraulic liquid. Thus the load would lower itself and the energy released thereby would propel the truck. In this way an accident could be caused.

To avoid these possibilities a mechanical interlock is provided between the two separate actuators 36 and 39 of control valves 24 and 32. A preferred form of interlock is illustrated in FIGURES 3, 4 and 5. A slidable plate 50 is suitably supported above the tops of the control valves 24 and 32, which are placed side by side. The plate 50 is provided with a shaped slot 51 through which the actuator lever 36 passes, an oppositely shaped slot 52 through which the actuator lever 39 passes, and a third slot 53 through which two pins 54 and 55 pass. The slot 53 and the co-operating pins 54 and 55 are provided to constrain the plate to move in one direction and obviously alternative means may be used to secure this effect. In FIGURE 4 the actuator levers 36 and 39 are both in the neutral position so that they are centrally disposed in relation to the slots 51 and 52.

In FIGURE 5 the actuator lever 39 has been moved into one of its operative positions, i.e. upwardly on the drawing. Due to the co-action between the actuator lever and the sloping side of the slot 52 the plate 50 is moved to the left on the drawing, so that the actuator lever 36 is engaged by the portion 56 of the slot 51 and is thereby prevented from moving out of its central position. It will be evident that if the actuator rod 39 is moved in the other direction from its neutral position so that it moves into the lower portion of the slot 52, exactly the same effect is produced. If, with the two actuator levers initially in the position shown in FIGURE 4, the lever 36 is moved into either of its operative positions the plate 50 is caused to move to the right on the drawing, thus locking the actuator lever 39 in the neutral position. In this way the control of the hydraulic motor and the hydraulic lifting means are effectively separated, so that the two cannot be brought into operation together.

I claim:

1. Mobile load handling equipment comprising a wheeled chassis, a power unit mounted on the chassis, a hydraulic pump driven by the power unit, a hydraulic motor adapted to drive at least one of the chassis wheels, hydraulic lifting means, and hydraulic control means for separately controlling the hydraulic motor and the lifting means including separate valves and actuator therefor for the motor and lifting means respectively a locking slide connection between the said separate valve actuators, and means whereby operation of any of the actuators displace the slide to lock the remaining actuators in valve neutral position.

2. Mobile load handling equipment comprising a wheeled chassis, a power unit mounted in the chassis, a hydraulic pump driven by the power unit, a hydraulic motor adapted to drive at least one of the chassis wheels, hydraulic lifting means in combination with control means for separately controlling the hydraulic motor and lifting means, said control means comprising two three-position valves having actuator levers, one valve providing forward, reverse and neutral positions for the motor, and the other valve providing lift, lower and neutral positions for the lifting means, a guided plate connecting the two valves in side-by-side relation and having two slots each engaged by one of the valve actuator levers, the slots being so shaped that movement of either actuator lever to a valve operated position moves the plate to a position in which the other actuator lever is locked in the neutral position.

3. Mobile load handling equipment comprising a wheeled chassis, a power unit mounted on the chassis, a hydraulic pump driven by the power unit, a hydraulic motor adapted to drive at least one of the chassis wheels, hydraulic lifting means, and hydraulic control means for separately controlling the hydraulic motor and the lifting means, said control means including separate valves each with its own actuator for motor and lifting means respectively, said valves each providing operating and neutral positions by displacement of its respective actuator, a mechanical interlock connector between the separate actuators displaceable by operation of any actuator, and means whereby displacement of the interlock connector by any valve actuator to an operated position causes the connector to lock the remaining valves in neutral position.

References Cited in the file of this patent

UNITED STATES PATENTS

| | | |
|---|---|---|
| 2,320,601 | Howell | July 1, 1943 |
| 2,327,848 | Schroeder | Aug. 24, 1943 |
| 2,456,320 | Repke | Dec. 14, 1948 |
| 2,789,648 | Huffman | Apr. 23, 1957 |